United States Patent

Isaka et al.

[11] Patent Number: 5,280,311
[45] Date of Patent: Jan. 18, 1994

[54] IMAGE FORMING APPARATUS FEATURING A CUSTOM FORMED SCANNED SURFACE FOR EFFECTING HIGH DEFINITION IMAGES

[75] Inventors: Kazuo Isaka, Tokyo; Masayuki Suzuki, Zama; Akihiro Mouri, Atsugi, all of Japan

[73] Assignee: Canon Kabushiki Kaisha, Tokyo, Japan

[21] Appl. No.: 727,085

[22] Filed: Jul. 9, 1991

[30] Foreign Application Priority Data

Jul. 11, 1990 [JP] Japan .................. 2-183344

[51] Int. Cl.⁵ .............................. G02B 27/00
[52] U.S. Cl. ........................... 346/160; 355/211
[58] Field of Search ............ 355/211, 212, 213; 346/108, 160, 76; 358/493

[56] References Cited

U.S. PATENT DOCUMENTS

| 3,809,806 | 5/1974 | Walker et al. | 346/108 X |
| 4,285,590 | 8/1991 | Silverberg | 355/212 |
| 4,318,582 | 3/1982 | Minoura et al. | 350/6.6 |
| 4,551,406 | 11/1985 | Schaedlich et al. | 355/211 |
| 4,576,448 | 3/1986 | Ikari | 350/465 |
| 4,750,045 | 6/1988 | Ohara et al. | 358/302 X |
| 4,904,557 | 2/1990 | Kubo | 346/160 X |

FOREIGN PATENT DOCUMENTS

| 0213511 | 3/1987 | European Pat. Off. |
| 0116603 | 7/1984 | Japan |
| 0128353 | 5/1988 | Japan |
| 0286859 | 11/1988 | Japan |
| 0185554 | 7/1989 | Japan |

Primary Examiner—A. T. Grimley
Assistant Examiner—Robert Beatty
Attorney, Agent, or Firm—Fitzpatrick, Cella, Harper & Scinto

[57] ABSTRACT

An image forming apparatus forms image information by introducing a light beam emitted from a light source and deflected by a light deflecting device to the surface of an image carrying member through an optical image forming system and then by scanning the surface of the image carrying member using that light beam. The surface to be scanned of the image carrying member is shaped into a form which corresponds to the optical characteristics of the optical forming system. Consequently, the resultant image forming apparatus has a simple structure and is capable of forming high definition images.

18 Claims, 5 Drawing Sheets

IMAGE FORMING APPARATUS FEATURING A CUSTOM FORMED SCANNED SURFACE FOR EFFECTING HIGH DEFINITION IMAGES

BACKGROUND OF THE INVENTION

The present invention relates to an image forming apparatus. More particularly, the present invention pertains to an image forming apparatus for forming image information, such as characters or figures, on the surface of an image carrying member by directing a modulated light beam emitted from a light source to the surface of the image carrying member having a predetermined shape, such as a photosensitive drum or a recording material, e.g., a silver salt film, through a light deflecting device, such as a rotating polygonal mirror, and by scanning the surface of the image carrying member using that light beam. Such an image forming apparatus can be suitably applied to, for example, a laser beam printer (LBP) or a process optical printer.

Conventional image forming apparatuses, such as laser beam printers, form image information by scanning the surface of an image carrying member by means of an optical scanning system using a light beam modulated by and emitted from a laser beam source.

Generally, in laser beam printers, the light modulated by and emitted from the light source is converged into a beam made up of parallel rays of light by means of a collimator lens, and then is made incident on a reflecting surface of a light deflecting device which may be a rotating polygonal mirror.

The light beam reflected by the reflecting surface of the light deflecting device is gathered by means of a scanning lens exhibiting $f-\theta$ characteristics, and is then directed to the surface to be scanned which is the image carrying member. The surface to be scanned is scanned using that light beam by rotating the light deflecting device by means of a motor or the like.

Recently there has been an increasing demand for an image forming apparatus capable of high density, i.e., high definition, recording of image information. To achieve high definition recording of the image information, in scanning the surface a light beam having a small spot size is generally required. However, a reduction in the spot size of the light beam results in a reduction of the depth of focus on the surface to be scanned, thus necessitating an optical image forming system ($f-\theta$ lens) which exhibits less curvature of the field.

To achieve a high definition or high quality image by reducing the light beam spot size on the surface to be scanned, a reduction in the F-number (FNo) of the optical image forming system, such as a $f-\theta$ lens, is desired.

However, a reduction in the FNo of the $f-\theta$ lens decreases the size of the light beam incident on the $f-\theta$ lens, and rapidly reduces the depth of focus. Hence, very high assembly accuracy of the surface to be scanned is required. This makes manufacture of the surface to be scanned very difficult.

In an optical scanning system provided with a means for performing tilt correction of the light deflecting device, such as a rotating polygonal mirror, it is very difficult to reduce the FNo of the $f-\theta$ lens. In the case of an optical scanning system having, for example, a scanning width corresponding to the A4 through A3 paper sizes, the FNo is generally between 20 and 30.

In the optical scanning apparatus which employs a laser beam as a light source, the diameter of the spot L and the depth of focus H on the surface to be scanned approximately have the following relationships:

$$L = k\lambda F \quad (1)$$

$$H = \pm 2\lambda F^2 \quad (2)$$

where $\lambda$ is the wavelength of the light beam, F is the FNo of the optical system, and k is a constant ($k \geq 1.64$) which represents the intensity of the light beam in the vicinity of the pupil of the $f-\theta$ lens. The spot diameter L is a value obtained when the intensity of light is reduced to $1/e^2$ of the maximum peak intensity.

Table 1 lists the spot diameter L and depth of focus H in the horizontal direction in which a light beam is moved. The values shown in Table 1 have been calculated using the wavelength $\lambda = 0.78$ μm and the constant $k = 1.7$.

TABLE 1

| F-Number of the Optical System | Spot Diameter (μm) | Depth of Focus (mm) |
|---|---|---|
| 70 | 93 | ±7.6 |
| 60 | 80 | ±5.6 |
| 50 | 66 | ±3.9 |
| 40 | 53 | ±2.5 |
| 30 | 40 | ±1.4 |
| 20 | 27 | ±0.62 |
| 15 | 20 | ±0.35 |
| 10 | 13 | ±0.16 |

As can be seen from the Table 1, when the FNo of the $f-\theta$ lens is, for example, about 15 and the spot diameter is 20 μm or less, the depth of focus is ±0.35 mm or less.

Generally, the curvature of field on the surface to be scanned has different distribution characteristics in the horizontal (the meridional direction, indicated by a curve M in FIG. 1) and the vertical (the sagittal direction, indicated by a curve S in FIG. 1) directions, as shown in FIG. 1.

In an optical scanning apparatus, because the light beam diameter is large with respect to the vertical direction (in the direction perpendicular to the direction in which scanning is performed by the scanning means), the allowable degree of aberration is large. However, with respect to the horizontal direction (the direction in which scanning is performed by the scanning means), the light beam diameter is about one half of that in the vertical direction, and the allowable degree of aberration is thus small.

As can be seen from Table 1, when the spot diameter is about 20 μm, the depth of focus is ±0.35 mm. Therefore, when the curvature of the field is ±0.35 mm, the aberration allowance of the surface to be scanned, e.g., the image carrying member, is zero in terms of the shape or arrangement thereof. As a result, if the spot diameter of the light beam is 20 μm or less, a solution may not be available for the design of an optical scanning system using conventional techniques.

Accordingly, Japanese Laid-Open Patent No. 116603/1984 discloses an image forming apparatus which has a control system for correcting image formed position errors such that the position on the surface to be scanned at which the spot of a light beam is formed coincides with the focal point thereof.

However, the optical system of such an image forming apparatus is complicated, and hence the apparatus including the control system is very expensive.

In the case of an image forming apparatus having a post objective type optical scanning system, since the surface to be scanned of the image carrying member is cylindrical, the overall size of the image forming apparatus is large. Also, the construction of the conveying system is complicated.

SUMMARY OF THE INVENTION

An object of the present invention is to provide an image forming apparatus in which the surface to be scanned of an image carrying member is shaped into an adequate form so as to simplify the structure of the apparatus and to achieve high definition, high resolution formation of image information.

To achieve the foregoing object, the present invention provides an image forming apparatus for forming image information by scanning the surface of an image carrying member using a light beam introduced to that surface through an image forming optical system from a light deflecting device after being emitted from a light source. The surface to be scanned of the image carrying member is shaped into a curved form which corresponds to the optical characteristics of the image forming optical system.

The optical characteristics of the image forming optical system may be a curved surface which is made up of the points at which the curvature of field or the diameter of the light beam from the optical image forming system is minimized.

According to one aspect, the present invention pertains to an image forming apparatus including a light source unit for emitting a light beam; a deflection means for deflecting the light beam; an optical means for directing the light beam deflected by the deflection means; and an image carrying member to be scanned by the light beam directed by the optical means, a surface of the image carrying member being shaped in a form corresponding to the optical characteristics of the optical means.

The invention in another aspect pertains to an optical scanning apparatus including a light source unit for emitting a light beam; an deflection means for deflecting the light beam; an optical means for directing the light beam deflected by the deflection means; and a surface to be scanned by the light beam directed by the optical means, the surface to be scanned being shaped in a curved form corresponding to the optical characteristics of the optical means.

The invention in still another aspect pertains to an image information forming method in an image forming apparatus, including the steps of deflecting alight beam from a light source unit by deflection means; scanning an image carrying member with the light beam deflected by the deflection means and directed by an optical means; and forming a surface to be scanned of the image carrying member into a shape corresponding to the optical characteristics of the optical means.

The invention in yet another aspect pertains to a scanning method in an optical scanning apparatus, including the steps of deflecting a light beam from a light source unit by deflection means; scanning a surface to be scanned with the light beam deflected by said deflection means and directed by an optical means; and forming the surface to be scanned into a shape corresponding to the optical characteristics of the optical means.

DETAILED DESCRIPTION OF THE PREFERRED EMBODIMENTS

Figure 1:
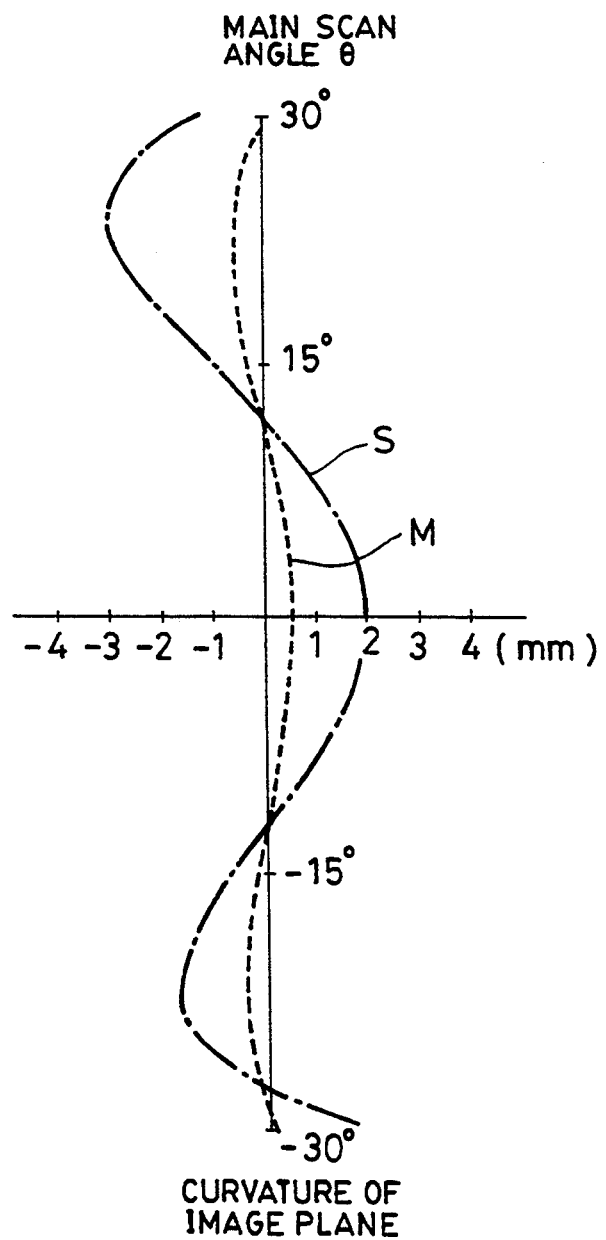
FIG. 1 illustrates a curvature of the field.
Figure 2:
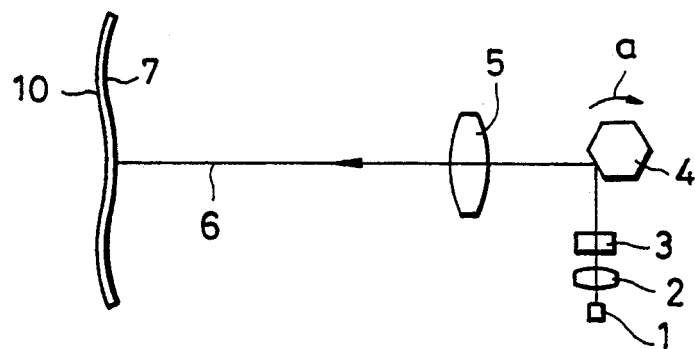
FIG. 2 is a schematic view, taken along the horizontal scanning section, of an optical scanning system employed in a first embodiment of an image forming apparatus according to the present invention.

FIG. 2 is a schematic view, taken along the horizontal scanning section, of an optical scanning system used in a first embodiment of an image forming apparatus according to the present invention.

The horizontal scanning section is a plane which is formed by a light beam moved by the light deflecting device with time and which contains an optical axis.

In FIG. 2, a light source 1 which may be a semiconductor layer emits a modulated light. A collimator lens 2 converts the light emitted from the light source 1 into a beam made up of parallel rays of light. A cylindrical lens 3 has a predetermined refractive power only in the vertical direction. A light deflecting device 4, comprising a rotary polygon mirror, rotates at a fixed speed in the direction indicated by an arrow 'a'. An optical image forming system 5 which is a $f-\theta$ lens is made up of a spherical lens and a toric lens. A light beam 6 is reflected by light deflecting device 4.

An image carrying member 10 on which an image is formed may be a photosensitive drum or a recording material, such as a silver salt film. The image carrying member 10 has a shape which substantially coincides with an image-formed curve 7 corresponding to the scanned surface made up of the points at which the spot diameter of the light beam gathered by the optical image forming system 5 is minimized. The photosensitive surface of the image carrying member 10 is located on this image-formed curve 7.

In this embodiment, the light emitted from the light source 1 is converged in the vertical direction by the cylindrical lens 3. The converged light beam forms a line image on the reflecting surface of the rotating polygonal mirror 4. The light beam 6 reflected by the reflecting surface of the rotating polygonal mirror 4 passes through the image forming optical system 5 to the photosensitive surface 7 which is the surface to be scanned to form a light spot. The light spot is moved along the photosensitive surface to form image information thereon.

As stated above, the photosensitive surface 7 of the image carrying member 10 is formed such that it substantially coincides with the image-formed curve made up of the points at which the light beam 6 directed by the image forming optical system 5 has a minimum spot size. Consequently, in this embodiment, the light beam 6 is always received on the photosensitive surface 7 with a minimum spot size so as to achieve formation of a high definition image.

Figure 3A:
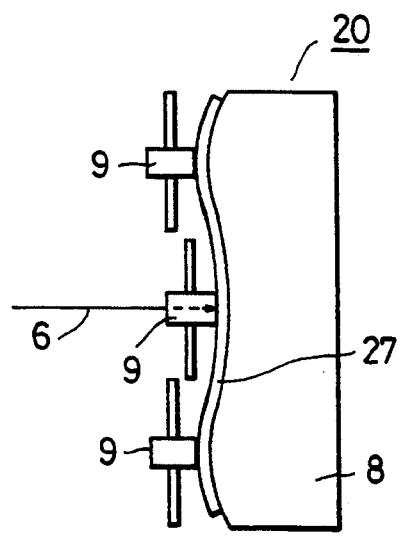
FIGS. 3A, 3B, 4, 5A, 5B, 6A and 6B are schematic views of an image carrying member, respectively, showing second to fifth embodiments of the image forming apparatus according to the present invention.

FIGS. 3 (A) and 3 (B), respectively, are schematic views, taken along the horizontal and vertical scanning sections, of the image carrying member of a second embodiment of the image forming apparatus according to the present invention.

In the embodiment shown in FIGS. 3 (A) and 3 (B), a photosensitive member (the surface to be scanned) 27 comprises a recording material which is a silver salt film. The photosensitive member 27 is mounted on the surface of a supporting member 8 which will be described later.

The supporting member 8 is formed such that the surface to be scanned substantially coincides with the image-formed curve made up of the points at which the light beam 6 directed by the optical image forming system (not shown) has a minimum spot size. In this embodiment, the supporting member 8 and the photosensitive member 27, in combination, form an image carrying member 20.

Figure 3B:
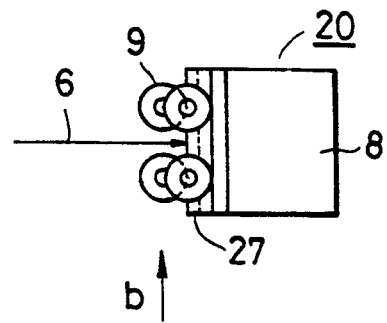

Feed members 9 convey the photosensitive member 27 such that it is in contact with the supporting member 8 in the direction indicated by an arrow 'b' in FIG. 3(B) during the scanning operation.

In this embodiment, the photosensitive member 27 is conveyed in a contact state by means of the feed members 9 during the scanning operation while the light beam 6 which has passed through the optical image forming system (not shown) is converged on the photosensitive member 27 in a spot so as to perform image formation over the entire surface of the photosensitive member 27.

In this embodiment, the photosensitive member 27 shown in FIG. 3 (A) is conveyed in a contact state by the feed members 9 in a direction perpendicular to the plane of the paper from the front surface thereof to the rear surface thereof during the scanning. The photosensitive member 27 shown in FIG. 3 (B) is conveyed in a contact state by the feed members 9 in the direction of the plane of the paper from the lower end to the upper end.

Figure 4:
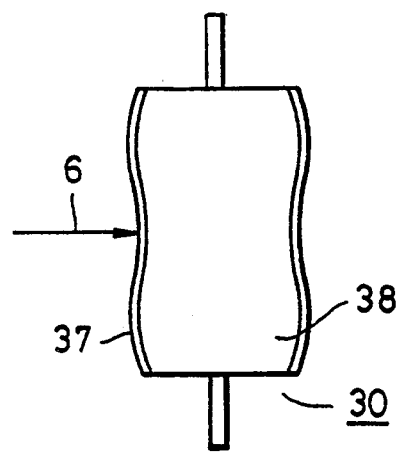

FIG. 4 is a schematic view of an image carrying member, showing a third embodiment of the image forming apparatus according to the present invention.

In FIG. 4, a reference numeral 37 denotes a photosensitive member, i.e., the surface to be scanned, which comprises a recording material, such as an organic photoconductor (OPC) for use in electrophotographic process or amorphous silicon (a-Si).

The recording material 37 is supported by a photosensitive drum body 38. In this embodiment, the surface of the photosensitive drum body 38 is formed such that it substantially coincides with the image-formed curve made up of the points at which the light beam 6 directed by the image forming optical system (not shown) has a minimum spot size, similar to the aforementioned embodiment.

In this embodiment, an image carrying member 30 is constructed by coating or depositing the recording material 7, such as the OPC for the electrophotographic process or a-Si, on the surface of the photosensitive drum body 38.

During the scanning operation, the light beam 6 which has passed through the optical image forming system (not shown) is converged on the photosensitive member 37 of the photosensitive drum body 38 so as to scan the photosensitive member 37. Consequently, a high definition image is formed on an optimum image forming surface.

Figure 5A:
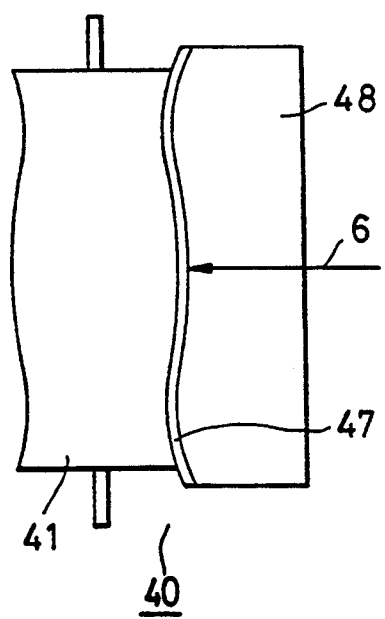
Figure 5B:
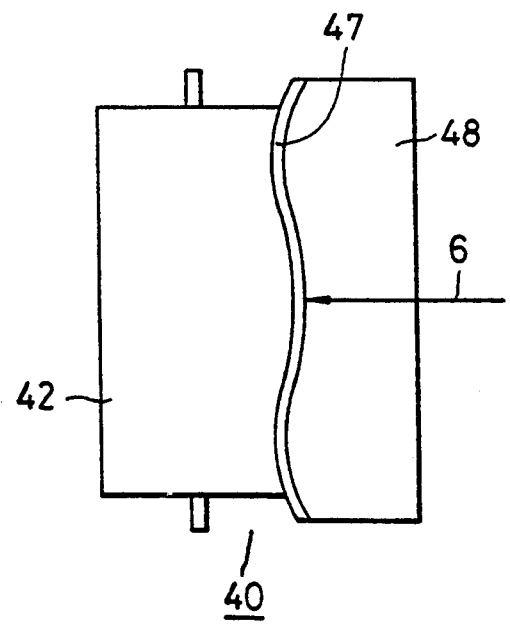

FIGS. 5(A) and 5(B), respectively schematic views of the image carrying member, showing a fourth embodiment of the present invention.

In the image carrying members 40 shown in FIGS. 5(A) and 5(B), a reference numeral 47 denotes a photosensitive member, i.e., the surface to be scanned, which is in contact with the surface of a supporting member 48 which will be described below.

In this embodiment, the supporting member 48 is made of a transparent glass which is subjected to surface processing. The surface of the transparent glass 48 which is in contact with the photosensitive member 47 is formed such that it substantially coincides with the image-formed curve made up of the points at which the light beam 6 directed by the image forming optical system (not shown) has a minimum spot size, similar to the aforementioned embodiments.

Reference numerals 41 and 42 denote a feed member for conveying the photosensitive member 47. The feed member 41 comprises a rubber roller having a shape corresponding to the image-formed curve. The feed member 42 comprises a sponge roller which is cylindrical. A portion of the feed member 42 makes contact with the curved surface of the support member 48, i.e., the photosensitive member 47, to conform to the shape of the surface of the support member 48.

In this embodiment, because the supporting member 48 is made of transparent glass, the light beam 6 can be made to be incident on the photosensitive member 47 through the transparent glass to form an image.

In this embodiment, the feed member is either a rubber roller (FIG. 5 (A)) or a sponge roller (FIG. 5 (B)), and the photosensitive member 47, which is to be scanned using a light beam, is closely attached to the supporting member 48. Consequently, recording of high definition image information can be conducted more stably.

Figure 6A:
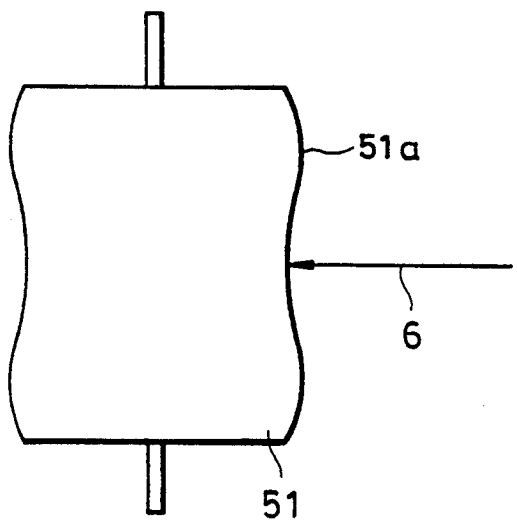
Figure 6B:
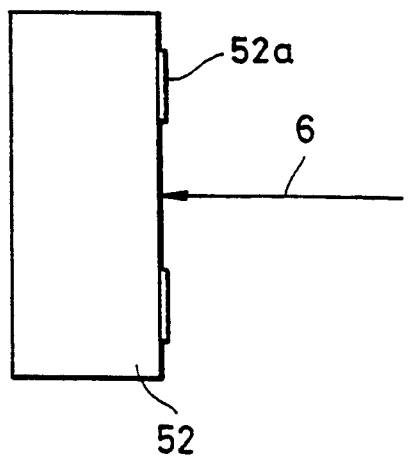

FIGS. 6 (A) and 6 (B) are schematic views of the image carrying member showing a fifth embodiment of the image forming apparatus according to the present invention.

Generally, the image-formed curve, made up of the points at which the light beam having a minimum spot size is received by the image forming optical system, such as a $f-\theta$ lens, is a complex curve.

Hence, in this embodiment, the surface of the image carrying member is formed such that it coincides with a curve or with a straight line obtained by approximating this complex image-formed curve, as shown in FIGS. 6 (A) and 6 (B).

FIG. 6 (A) shows an image carrying member 51 in which a surface 51a to be scanned, is approximated in a sine wave form. FIG. 6 (B) shows an image carrying member 52 in which a surface 52a to be scanned, is approximated in a step-like form.

The use of the image carrying member having the above-described form simplifies the structure of this embodiment and enables high-definition image information to be formed.

However, the surface of the image carrying member may also be formed in a saw-tooth wave or circumferential form, or approximate a curve corresponding to an arbitrary function.

Figure 6C:
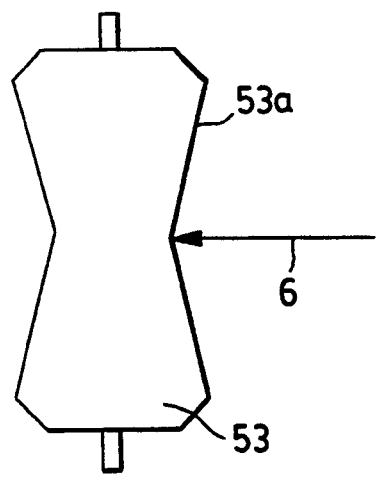

FIG. 6(C) shows an image carrying member 53 in which a surface 53a to be scanned by light beam 6 is approximated in a saw-tooth waveform.

As will be understood from the foregoing description, according to the present invention, there is provided an image forming apparatus for forming image information by scanning the surface of an image carrying member using a light beam introduced to that surface through an optical image forming system from a light deflecting device after being emitted from a light source. The surface to be scanned of the image carrying member is shaped into a form which corresponds to the optical characteristics of the image forming optical system.

The form of the surface to be scanned substantially coincides with the image-formed curve made up of the points at which the light beam directed by the image forming optical system has a minimum spot size or corresponds to the curvature of the field of the image forming optical system. Consequently, the resultant image forming apparatus has a simple structure and is capable of forming high-definition images.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An image forming apparatus comprising:
   a light source unit for emitting a light beam;
   deflection means for deflecting the light beam;
   optical means for directing the light beam deflected by said deflection means; and
   an image carrying member, to be scanned by the light beam directed by said optical means, having a surface shaped in a form corresponding to a curvature of field characteristic of said optical means.

2. The image forming apparatus according to claim 1, wherein the form of said surface substantially coincides with an image-formed curve made up of points at which the light beam is directed by said optical means to have a minimum size.

3. The image forming apparatus according to claim 1, wherein said image carrying member comprises a photosensitive member, and a support member for supporting said photosensitive member 4. The image forming apparatus according to claim 1, wherein said image carrying member comprises a photosensitive member, a support member for supporting said photosensitive member, and a contact member for bringing said photosensitive member into contact with said support member.

5. The image forming apparatus according to claim 1, wherein the form of said surface comprises a shape of an arbitrary curve.

6. The image forming apparatus according to claim 1, wherein the form of said surface comprises a shape of a sawtooth wave.

7. The image forming apparatus according to claim 1, wherein the form of said surface comprises a shape of a plurality of steps.

8. An optical scanning apparatus comprising:
   a light source unit for emitting a light beam;
   deflection means for deflecting the light beam;
   optical means for directing the light beam deflected by said deflection means; and
   a surface to be scanned by the light beam directed by said optical means, said surface being shaped in a form corresponding to a curvature of field characteristic of said optical means.

9. The optical scanning apparatus according to claim 8, wherein the form of said surface substantially coincides with an image-formed curve made up of points at which the light beam is directed by said optical means to have a minimum size.

10. The optical scanning apparatus according to claim 8, wherein the form of said surface comprises a shape of an arbitrary curve.

11. The optical scanning apparatus according to claim 8, wherein the form of said surface comprises a shape of a sawtooth wave.

12. The optical scanning apparatus according to claim 8, wherein the form of said surface comprises a shape of a plurality of steps.

13. An image information forming method in an image forming apparatus, comprising the steps of:
   deflecting a light beam from a light source unit by a deflection means;
   directing the light beam deflected by said deflecting means by an optical mean; and
   scanning an image carrying member, which has a surface shape corresponding to a curvature of a field characteristic of an optical means, with the light beam deflected by the deflection means and directed by the optical mean such that the light beam which is directed by the optical means will have a minimum size.

14. The image information forming method according to claim 13, wherein the shape of said image carrying member substantially coincides with an image formed curve made up of points at which the light beam is directed by said optical means to have a minimum size.

15. The image information forming method according to claim 13, wherein said image carrying member comprises a photosensitive member, and a support member for supporting said photosensitive member.

16. The image information forming method according to claim 13, wherein said image carrying member comprises a photosensitive member, a support member for supporting said photosensitive member, and a contact member for bringing said photosensitive member into contact with said support member.

17. A scanning method in an optical scanning apparatus, comprising the steps of:
   deflecting a light beam from a light source unit by deflection means;
   directing the light beam deflected by said deflection means by an optical means; and
   scanning a surface, which has a shape corresponding to a curvature of a field characteristic of an optical means, with the light beam deflected by the deflection means and directed by the optical means such that the light beam which is directed by the optical means will have a minimum size.

18. The scanning method according to claim 17, wherein the formed surface shape substantially coincides with an image formed curve made up of points at which the light beam is directed by said optical means to have a minimum size.

* * * * *

UNITED STATES PATENT AND TRADEMARK OFFICE
CERTIFICATE OF CORRECTION

PATENT NO. : 5,280,311
DATED : January 18, 1994
INVENTOR(S) : Isaka et al.

It is certified that error appears in the above-indentified patent and that said Letters Patent is hereby corrected as shown below:

COLUMN 3:

Line 42, "an" should read --a--; and
Line 51, "alight" should read --a light--.

COLUMN 4:

Line 5, "6A and 6B" should read --6A, 6B and 6C--; and
Line 20, "layer" should read --laser--.

COLUMN 5:

Line 51, "material 7," should read --material 37,--; and
Line 61, "respectively" should read --respectively, are--.

COLUMN 7:

Line 40, "member" should read --member.--.

Signed and Sealed this

Seventeenth Day of January, 1995

Attest:

BRUCE LEHMAN

*Attesting Officer*  *Commissioner of Patents and Trademarks*